United States Patent [19]
Guercio et al.

[11] Patent Number: 5,796,815
[45] Date of Patent: Aug. 18, 1998

US005796815A

[54] COMMUNICATIONS DEVICE WITH IMPROVED RING SIGNAL DETECTION

[75] Inventors: David J. Guercio, Austin; Zheng-Yi Xie, Richardson, both of Tex.

[73] Assignee: Advanced Micro Devices, Inc., Sunnyvale, Calif.

[21] Appl. No.: 760,818

[22] Filed: Dec. 5, 1996

[51] Int. Cl.$^6$ .............................. H04M 1/00; H04M 1/57
[52] U.S. Cl. ........................ 379/372; 379/142; 379/252; 379/373; 379/377
[58] Field of Search .................................. 379/372, 373, 379/377, 142, 201, 375, 350, 258, 252, 253, 399, 413

[56] References Cited

U.S. PATENT DOCUMENTS

| | | | |
|---|---|---|---|
| 5,483,577 | 1/1996 | Gulick | 379/357 |
| 5,655,011 | 8/1997 | Brown | 379/142 |
| 5,680,447 | 10/1997 | Diamond et al. | 379/142 |
| 5,694,465 | 12/1997 | Apfel | 379/399 |
| 5,699,418 | 12/1997 | Jones | 379/142 |
| 5,699,419 | 12/1997 | Ardon | 379/373 |

OTHER PUBLICATIONS

Tussing et al., Application Note entitled, "The Application of a Telephone Tone Ringer as a Ring Detector," *Motorola Telecommunications Device Data*, 1985, pp. 3–66.

MC34012–1, MC34012–2 & MC34012–3 Data Sheet from *Motorola Telecommunications Device Data*, 1985, pp. 2–201 through 2–207.

Mitel Corporation CMOS MT8843 Product Data Sheet, Issue 3, Apr. 1996, pp. 5–1 through 5–22.

Mitel Corporation MSAN–164 Product Data Sheet, Issue 1, Oct. 1996, pp. 5–1 through 5–18.

*Primary Examiner*—Krista Zele
*Assistant Examiner*—Jacques M. Saint-Surin
*Attorney, Agent, or Firm*—Conley, Rose & Tayon

[57] ABSTRACT

A communications device is presented which is able to detect a ring signal without the need for dedicated ring signal detection circuitry. The communications device includes a hookswitch coupled between a telephone line and a communications circuit. In an open mode of the hookswitch, an electrical resistance of at least 25 megohms exists between two switch terminals of the hookswitch, and the communications circuit is essentially disconnected from the telephone line at d.c. A capacitor positioned between the switch terminals of the hookswitch couples a.c. signals from the telephone line to the communications circuit when the hookswitch is in the open mode. A DSP of the communications circuit performs ring signal detection when the hookswitch is in the open mode using electrical power provided by a power supply. The input impedance of the communications circuit is substantially equivalent to a series combination of an inductance and a resistance. The series combination of the capacitor and the equivalent inductance and resistance of the input impedance of the communications circuit effectively forms an R-L-C highpass filter. The value of the capacitor is operably chosen such that: (i) the amplitudes of 20 Hz ring signals are reduced to below a 1.0 Vp-p maximum allowable input voltage range of common analog-to-digital converters, and (ii) the amplitudes of a.c. signals at Caller ID frequency shift keying frequencies of 1,200 Hz and 2,200 Hz are not increased or attenuated to a degree which would impair Caller ID circuit operation.

20 Claims, 5 Drawing Sheets

1

COMMUNICATIONS DEVICE WITH IMPROVED RING SIGNAL DETECTION

FIELD OF THE INVENTION

The present invention relates to telecommunications equipment and more specifically to the manufacture of communications devices which detect ring signals and automatically transmit or receive information following detection of one or more ring signals.

DESCRIPTION OF THE RELATED ART

Telephone subscribers communicate via a vast telephone network. A telephone subscriber's communications devices are typically connected in parallel to a two-wire telephone line which links a subscriber's premises to a telephone service provider's central office. An ordinary telephone is the most familiar of such communications devices. An ordinary telephone includes a handset, and the handset includes a receiver and a transmitter. The receiver is designed to be placed over a user's ear during use, and the transmitter designed to be positioned in close proximity to the user's mouth during use. When the telephone is not in use, the handset is placed in a cradle. The weight of the handset positioned in its cradle causes an electrical switch called a hookswitch to be opened, disconnecting all parts of the telephone from the telephone line except a ringer circuit. When a calling party places a telephone call to a receiving party, switching equipment in the central office transmits a series of ring signals over the receiving party's telephone line. The ring signals cause the ringer circuit of the receiving party's telephone to generate sounds which alert the receiving party to an incoming telephone call. At the same time, the switching equipment sends a series of ring-back signals to the calling party to let the calling party know that the telephone call is being placed. When the receiving party lifts the handset from its cradle to answer the incoming telephone call, the hookswitch closes, and the switching equipment completes an electrical circuit between the calling party and the receiving party.

Several different types of communications devices are designed to automatically transmit or receive information following detection of one or more ring signals. Examples of such communications devices include telephone answering machines and digital communications devices equipped with modulator-demodulators (modems). An answering machine typically includes control circuitry which electrically connects a voice message unit to the telephone line after a predetermined number of ring signals are detected, causes the voice message unit to transmit (i.e., play back) a pre-recorded outgoing voice message, and then receives and records any incoming voice message transmitted by the calling party following transmission of the outgoing voice message. Digital communications devices equipped with modems exchange frequency-encoded information via the telephone network. Facsimile (fax) machines are examples of such digital communications devices. A fax machine typically includes control circuitry which electrically connects a modem to a telephone line after a predetermined number of ring signals are detected, then either transmits or receives frequency-encoded digital information. A modulator portion of a modem within a transmitting fax machine converts a digital value (i.e., a logic one or a logic zero) to a corresponding analog tone. A demodulator portion of a modem within a receiving fax machine performs the opposite function, converting the analog tone to the corresponding digital value.

2

The two-wire telephone line from the telephone service provider's central office to the subscriber's premises carries direct current (d.c.) operating power to power the subscriber's communications devices during use. In addition, several types of alternating current (a.c.) signals travel along the telephone line. Speech signals are a.c. signals, and span a frequency range from about 300 Hz to approximately 3,000 Hz. The analog tones used by digital communications devices to exchange digital data are also a.c. signals within the same 300 Hz to 3,000 Hz frequency range. As defined herein, the term "voiceband signals" describes a.c. signals within a frequency range from about 300 Hz to approximately 3,000 Hz.

Switching equipment within a central office generates voiceband signals with special meaning, including a dial tone signal, a busy signal, and the ring signal described above. When a user picks up the handset of a telephone to place a call to a second party, switching equipment in the central office detects the resulting closing of the hookswitch and transmits a dial tone to notify the user that the telephone line is functional. In the United States, the dial tone is a combination of a 350 Hz tone and a 440 Hz tone transmitted continuously. When the user dials the first digit of the telephone number of the second party, the switching equipment stops transmitting the dial tone. If the telephone line of the second party is in use, the switching equipment transmits a busy signal to notify the user of the in-use condition. In the United States, the busy signal is a combination of a 480 Hz tone and a 620 Hz tone alternately pulsed on for 0.5 second and off for 0.5 second.

FIG. 1 is a block diagram of a prior art communications device 100 which automatically transmits or receives information following detection of one or more ring signals. Communications device 100 includes a connector 102, a two-wire signal line 103, a ring detector 104, a hookswitch 106, a control unit 108, a communications circuit 110, and a key pad 1 12. Connector 102 is adapted to couple communications device 100 to a two-wire telephone line. At one end of signal line 103, connector 102 connects each wire of the telephone line to a separate wire of signal line 103. The other end of signal line 103 is connected to an input/output port of communications circuit 110. Ring detector 104 has an input port coupled to both wires of signal line 103, and an output port coupled to an input port of control unit 108. Hookswitch 106 is positioned in one of the two wires of signal line 103 between ring detector 104 and communications device 110 as shown. Key pad 112 is coupled to control unit 108 and includes multiple pressure-activated switches for user input.

Communications circuit 110 is the portion of communications device 100 which transmits or receives voiceband signals. For example, if communications device 100 is a telephone answering machine, communications circuit 110 includes a voice message unit which first transmits an outgoing voice message onto signal line 103, then receives and records any incoming voice message received from signal line 103. Ring detector 104 is coupled to receive a ring signal transmitted between the two wires of the telephone line by switching equipment in the central office. When ring detector 104 detects a ring signal, it generates a ring detect signal. Control unit 108 is coupled to receive the ring detect signal. Hookswitch 106 performs an electrical switching function between a first switch terminal 114 and a second switch terminal 116. Hookswitch 106 also includes a control terminal 118 coupled to receive a hookswitch control signal generated by control unit 108. When the hookswitch control signal is not asserted, hookswitch 106 is in an "open" configuration (i.e., mode), and an electrical resistance greater than 25,000,000 ohms (25 megohms) exists between the first and second switch terminals. When control unit 108 asserts the hookswitch control signal, hookswitch 106 transitions to a "closed" configuration (i.e., mode), and the electrical resistance between the first and second switch terminals is typically reduced to less than 1 ohm.

When communications device 100 is not transmitting or receiving information, the hookswitch control signal is deasserted and hookswitch 106 is in the open mode. When hookswitch 106 is in the open mode, communications circuit 110 is in effect disconnected from the telephone line and does not receive d.c. operating power supplied by the central office. Ring detector 104, on the other hand, is always coupled to the telephone line. Ring detector 104 does not use d.c. operating power, and is always capable of detecting an a.c. ring signal generated by the central office. When ring detector 104 detects a ring signal, it asserts the ring detect signal. Control unit 108 typically includes a counter circuit which is incremented each time the ring detect signal is asserted. Control unit 108 typically asserts the hookswitch control signals after the ring detect signal has been asserted a predetermined number of times (i.e., after a predetermined number of ring signals have been detected). Assertion of the hookswitch control signal causes hookswitch 106 to transition from the open mode to the closed mode. When hookswitch 106 is in the closed mode, communications circuit 110 is connected to the telephone line, and uses the d.c. operating power supplied by the central office to perform its intended function.

Telephone service providers also offer "Caller ID" services which provide information about a calling party. Devices which receive, store, and display digital Caller ID information are widely available. The Caller ID service is typically available to telephone subscribers for a small additional monthly fee. Under current standards, frequency-encoded digital Caller ID information is transmitted between the first and second ring signals. Information about a calling party is thus received, stored, and displayed by a Caller ID device before a user would normally answer a ringing telephone. Caller ID information is typically recorded by Caller ID devices whether the associated telephone is answered or not.

Modern communications devices convert incoming analog voiceband signals to digital representations and process the digital representations. Such communications devices include analog-to-digital converters and digital signal processors (DSPs). Analog-to-digital converters sample incoming signals at regular intervals and convert the incoming signals to digital representations, thus producing a stream of digitized input signal information. DSPs typically perform signal processing operations upon the stream of digitized input signal information produced by the analog-to-digital converters. One such signal processing operation is data compression which reduces the amount of storage space required to store digitized voice messages in a digital memory. DSPs also perform sophisticated tone detection operations (i.e., demodulation functions) required by modern telephone services such as Caller ID. The DSPs of modern communications devices are also capable of detecting ring signals generated by switching equipment in the central office, eliminating the need for dedicated ring detection circuitry. Eliminating the dedicated ring detection circuitry reduces the number of parts which must be procured and interconnected to form a communications device, reduces the complexity and manufacturing cost of the communications device, and increases the reliability of the communications device. It would thus be advantageous to use the existing DSP within a modern communications device to detect ring signals, thereby eliminating the need for dedicated ring detection circuitry.

SUMMARY OF THE INVENTION

A communications device is presented which is able to detect a ring signal without the need for dedicated ring signal detection circuitry. The communications device includes a hookswitch coupled between a telephone line and a communications circuit. The communications circuit includes an analog-to-digital converter and a DSP. The analog-to-digital converter provides a stream of digitized input signal information to the DSP. In an open mode of the hookswitch, a large electrical resistance, preferably greater than 25 megohms, exists between two switch terminals of the hookswitch, and the communications circuit is essentially disconnected from the telephone line at d.c. (i.e., 0 Hz). A capacitor positioned between the switch terminals of the hookswitch couples a.c. signals from the telephone line to the communications circuit when the hookswitch is in the open mode. The DSP performs ring signal detection when the hookswitch is in the open mode using electrical power provided by a power supply. The communications circuit is assumed to include a common hybrid circuit for coupling signals to and from the telephone line. The input impedance of the hybrid circuit is substantially equivalent to a 1.0 henry inductor in series with a 100 ohm resistor. The series combination of the capacitor and the inductor and resistor representing the input impedance of the hybrid circuit forms an R-L-C highpass filter. The value of the capacitor is operably chosen such that: (i) the amplitudes of 20 Hz ring signals are reduced to 1.0 Vp-p or below where 1.0 Vp-p is the maximum allowable input voltage range of common analog-to-digital converters, and (ii) the amplitudes of a.c. signals at Caller ID frequency shift keying frequencies of 1,200 Hz and 2,200 Hz are not attenuated to a degree which would impair Caller ID circuit operation.

The 100 Vp-p nominal amplitudes of 20 Hz ring signals far exceed the ±0.5 volt (i.e., 1.0 Vp-p) maximum allowable input voltage ranges of common analog-to-digital converters. The amplitudes of ring signals must thus be greatly reduced (i.e., substantially attenuated) before being applied to the input port of a common analog-to-digital converter. In addition, the amplitudes of signal components at the 1,200 Hz and 2,200 Hz Caller ID FSK frequencies must not be varied substantially in order to avoid Caller ID signal detection problems. The size of the capacitor is selected such that the amplitudes of 20 Hz ring signals are attenuated by at least 99 percent (i.e., by at least 40 $dB_v$) while the amplitudes of signal components at the 1,200 Hz and 2,200 Hz Caller ID FSK frequencies are not changed by more than 5 percent (i.e., are not attenuated more than 0.45 dBv or increased more than 0.42 $dB_v$). An example assumes a communications circuit with an input impedance equivalent to a 1.0 henry inductor in series with a 100 ohm resistor as described above. A value of 0.47 μF is chosen for the capacitor. As a result, the 100 Vp-p amplitudes of 20 Hz ring signals are attenuated to about 0.956 Vp-p (i.e., attenuated by about 40.4 dBv) while the amplitudes of a.c. signals at Caller ID FSK frequencies of 1,200 Hz and 2,200 Hz are increased by approximately 3.89 percent (0.33 dBv) and 1.13 percent (0.10 $dB_v$), respectively.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

The following publications are hereby incorporated by reference as though fully and completely set forth herein.

EIA-470-A, "Telephone Instruments With Loop Signaling," available from Electronic Industries Association, Engineering Department, Washington, D.C., is hereby incorporated by reference in its entirety.

Bellcore Technical Reference TR-NWT-000030, "Voiceband Data Transmission Interface Generic Requirements," available from Bellcore Customer Services, Piscataway, N.J., is hereby incorporated by reference in its entirety.

Bellcore Technical Reference TR-NWT-000031, "Calling Number Delivery," available from Bellcore Customer Services, Piscataway, N.J., is hereby incorporated by reference in its entirety.

Bellcore Technical Reference TR-NWT-001188, "Calling Name Delivery Generic Requirements," available from Bellcore Customer Services, Piscataway, N.J., is hereby incorporated by reference in its entirety.

*Digital Signal Processing Applications Using the ADSP-2100 Family* by Analog Devices, Inc., Volume 1, pp. 458–478, Prentice-Hall, Inc., Englewood Cliffs, N.J., hereby incorporated by reference.

Communications Device

Figure 1:
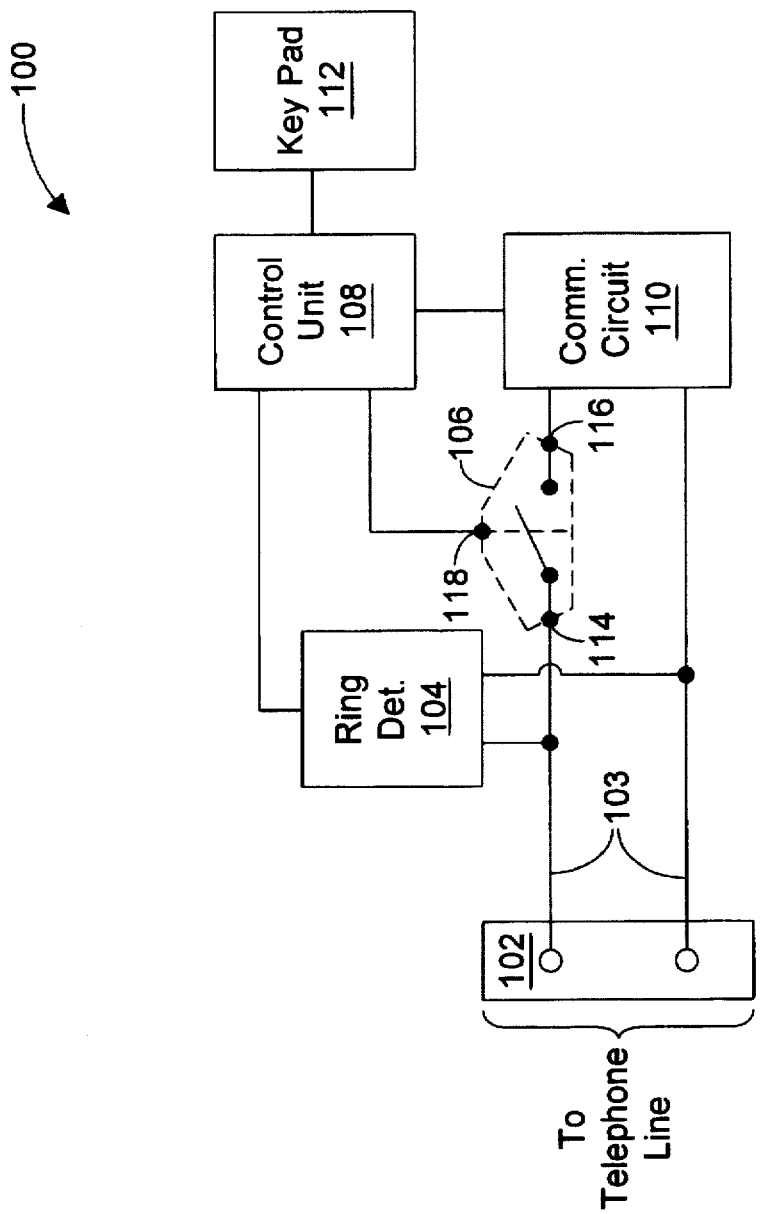
FIG. 1 is a block diagram of a prior art communications device which employs dedicated ring signal detection circuitry and automatically transmits or receives information following detection of one or more ring signals.
Figure 2:
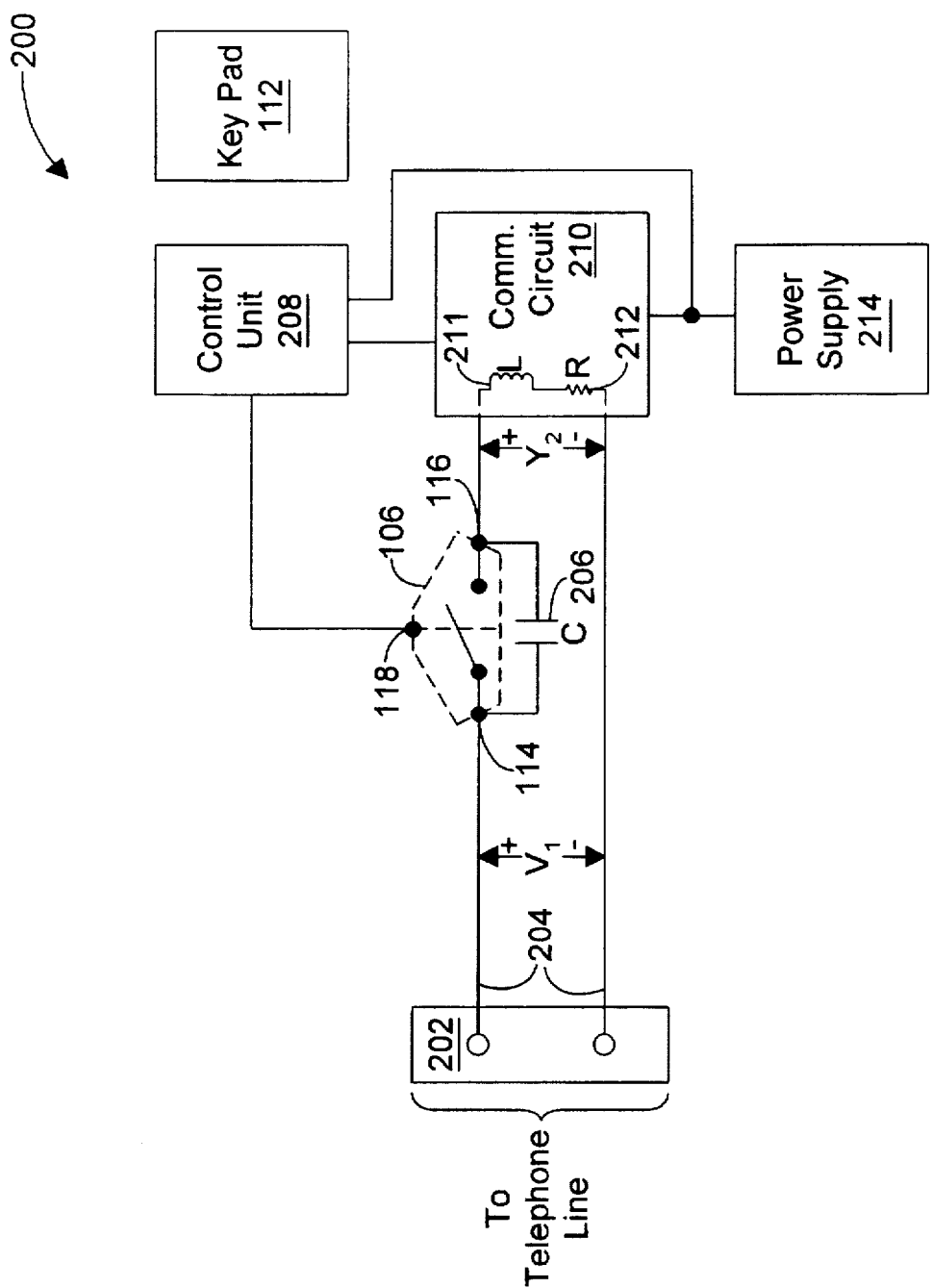
FIG. 2 is a block diagram of a communications device in accordance with the present invention and including a capacitor connected across a hookswitch, wherein the capacitor couples a.c. signals to a communications circuit of the communications device when the hookswitch is open, allowing the communications circuit to detect a ring signal without the need for dedicated ring signal detection circuitry.

FIG. 2 is a block diagram of a communications device 200 which is able to detect a ring signal without the need for dedicated ring signal detection circuitry. Communications device 200 automatically transmits or receives information following the detection of one or more ring signals. Examples of such communications devices include telephone answering machines and digital communications devices equipped with modulator-demodulators (modems).

Telephone answering machines are used to record voice messages left by calling parties when a user cannot answer a telephone. As described above, telephone answering machines typically operate by first playing a pre-recorded outgoing voice message, and then recording a calling party's message or response (i.e., an incoming voice message).

In this case, communications device 200 is designed to both transmit voiceband signals (i.e., the pre-recorded outgoing voice message) and receive voiceband signals (i.e., the incoming voice message).

Digital communications devices are equipped with modems in order to transmit messages. One common message transmission technique is known as frequency shift keying (FSK). The FSK technique uses two different analog tones to represent the two possible values of a single bit. A digital message may thus encoded as a series of analog tones. For example, the FSK technique is used to transmit Caller ID information. A 1,200 Hz tone represents a logical 1 (i.e., a mark) and a 2,200 Hz tone represents a logical 0 (i.e., a space). As mentioned above, Caller ID information is transmitted between a first ring signal and a second ring signal. Caller ID equipment complies with the above set of standards set forth by the Bell Communications Research Group (Bellcore).

Examples of digital communications devices with modems include facsimile (fax) machines and Caller ID devices. In the case of a fax machine, communications device 200 may be designed to transmit voiceband signals (i.e., frequency encode and transmit a pre-recorded digital message) or receive voiceband signals (i.e., decode and store a frequency-encoded digital message). In the case of a Caller ID device, communications device 200 is designed to receive voiceband signals (i.e., decode and store frequency-encoded digital information about the calling party).

Communications device 200 includes a connector 202, a two-wire signal line 204, a hookswitch 106, a capacitor 206, a control unit 208, a communications circuit 210, a power supply 214, and a key pad 112. Connector 202 is adapted to couple communications device 200 to a two-wire telephone line. Connector 202 has two terminals. One terminal of connector 202 is connected to one wire of the two-wire telephone line, and the other terminal of connector 202 is connected to the other wire of the two-wire telephone line. Two-wire signal line 204 has two ends. At one end of signal line 204, one wire of signal line 204 is connected to one terminal of connector 202, and the other wire is connected to the other terminal of connector 202. The other end of signal line 204 is connected to an input/output port of communications circuit 210. Hookswitch 106, described above, is installed in one of the two wires of signal line 204 between connector 202 and communications circuit 210 as shown in FIG. 2. Installation of hookswitch 106 may be described as cutting one of the two wires of signal line 204 to form two wire segments, connecting the loose end of the wire segment attached to a terminal of connector 202 to first switch terminal 114 of hookswitch 106, and connecting the loose end of the other wire segment to second switch terminal 116 of hookswitch 106.

Capacitor 206 couples a.c. signals from the telephone line to communications circuit 210 when hookswitch 106 is in the open mode, allowing communications circuit 210 to receive and detect ring signals. Capacitor 206 has two terminals. A first terminal of capacitor 206 is connected to the first switch terminal 114 of hookswitch 106, and a second terminal of capacitor 206 is connected to the second switch terminal 116 of hookswitch 106. Control unit 208 is connected to control terminal 118 of hookswitch 106 and to communications circuit 210, and controls the actions of hookswitch 106 and communications circuit 210. Communications circuit 210 is configured to detect ring signals and to transmit or receive voiceband signals. Power supply 214 provides electrical power to communications circuit 210 and to control unit 208. Power supply 214 preferably obtains power from a common utility a.c. power source during normal operation. Power supply 214 also preferably includes a battery, a battery charging circuit, and an automatic switching network to automatically supply power from the battery in case of a utility a.c. power outage. Key pad 112 is connected to control unit 208 and includes multiple pressure-activated switches for user input.

Communications circuit

Figure 3:
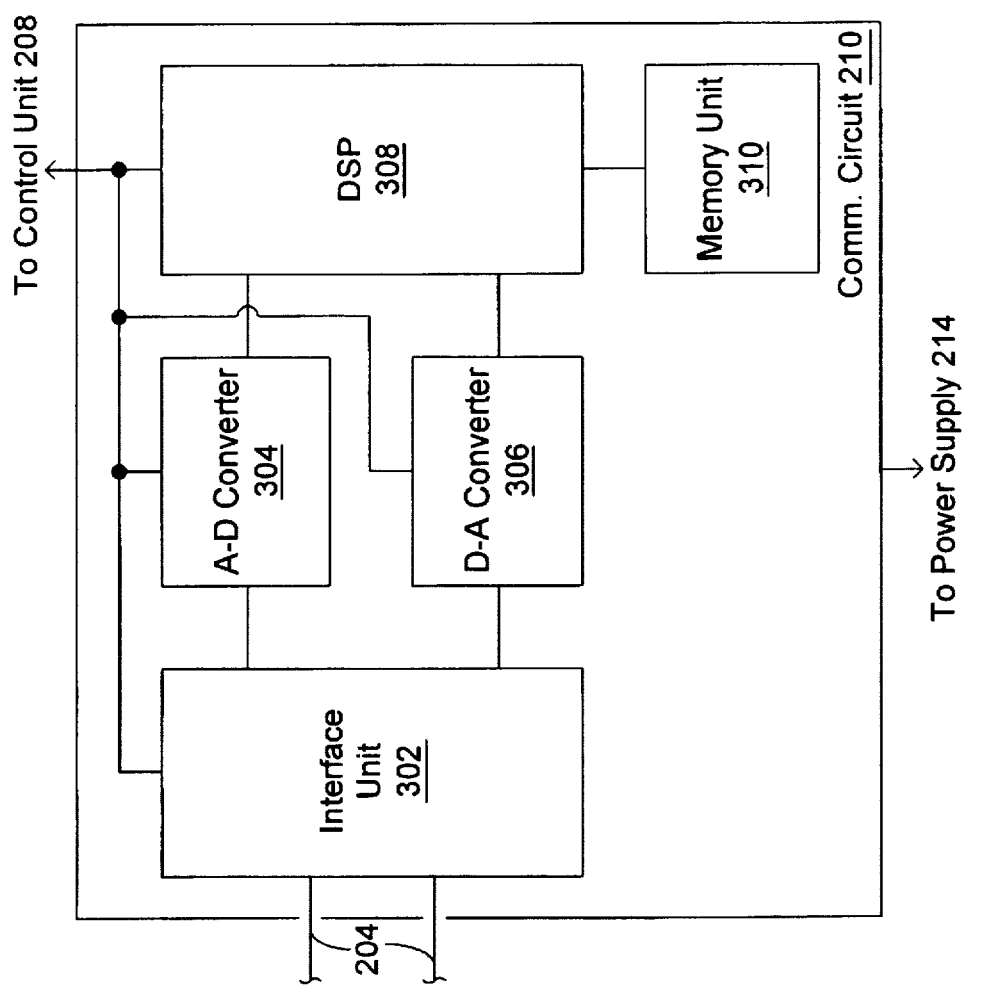
FIG. 3 is a block diagram of one embodiment of the communications circuit of the communications device of FIG. 2.

FIG. 3 is a block diagram of one embodiment of communications circuit 210. Communications circuit 210 is configured to detect ring signals and to automatically transmit or receive voiceband signals upon reception of an appropriate control signal from control unit 208. Control unit 208 issues the appropriate control signal after a predetermined number of ring signals are detected. Communications circuit 210 includes an interface unit 302, and analog-to-digital converter 304, a digital-to-analog converter 306, a DSP 308, and a memory unit 310. Memory unit 310 is configured to store data. Interface unit 302 is connected to both wires of signal line 204 at an input/output port of communications circuit 210. Interface unit 302 is configured to transmit voiceband signals upon signal line 204, and to receive a.c. signals (including voiceband signals) from signal line 204. Interface unit 302 thus transmits voiceband signals upon the telephone line and receives a.c. signals from the telephone line via signal line 204. Analog-to-digital converter 304 has an input port connected to interface unit 302, and receives an a.c. signal from interface unit 302 at the input port. Analog-to-digital converter 304 samples the amplitude of the a.c. signal at regular intervals, converts the amplitude samples to digital representations, and produces a stream of digital representations of the a.c. signal (i.e., digitized a.c. signal information) at an output port. DSP 308 has an input port connected to the output port of analog-to-digital converter 304, and receives the stream of digitized a.c. signal information produced by analog-to-digital converter 304. DSP 308 is also connected to control unit 208, and receives control signals from control unit 208.

As mentioned above, hookswitch 106 operates in two modes: an open mode and a closed mode. In the open mode, an electrical resistance of greater than 25 megohms exists between the first and second switch terminals. In the closed mode, an electrical resistance typically less than 1.0 ohm exists between the first and second switch terminals. When hookswitch 106 is in the open mode, capacitor 206 couples a.c. signals from the telephone line to the input/output port of communications circuit 210. DSP 308 executes a tone detection algorithm in order to detect a ring signal. When hookswitch 106 is in a closed mode, DSP 308 executes instructions associated with the transmission or reception of voiceband signals. When communications circuit 210 is designed to automatically receive voiceband signals, DSP 308 "compresses" the digital information (i.e., reduces the number of digital bits required to represent the digital information) received from analog-to-digital converter 304, and stores the compressed digital information in memory unit 310. When communications circuit 210 is designed to automatically transmit voiceband signals, DSP 308 retrieves stored compressed digital information from memory unit 310, "decompresses" the digital information (i.e., reproduces the original digital information from the compressed representation), and produces the original stream of digital information at an output port. The output port of DSP 308 is connected to a digital-to-analog converter 306. Digital-to-analog converter 306 receives the stream of digital information produced by DSP 308, converts the digital information to analog voiceband signals, and produces the voiceband signals at an output port. The output port of digital-to-analog converter 306 is connected to an input port of interface unit 302. Interface unit 302 receives the voiceband signals produced by digital-to-analog converter 306 and transmits the voiceband signals over the telephone line via signal line 204.

Digital Signal Processor

A suitable DSP is a model ADSP-2171 from Analog Devices, Norwood, Mass. As described above, DSP 308 executes a set of instructions which detect ring signals when hookswitch 106 is in the open mode. DSP 308 may implement one of many known tone detection algorithms in order to perform ring signal detection. A preferred tone detection algorithm is the (second-order) Goertzel algorithm which evaluates only a single frequency component of an input voiceband signal, and is thus particularly well suited to tone detection. The Goertzel algorithm is described in the above referenced publication entitled *Digital Signal Processing Applications Using the ADSP-2100 Family*.

DSP 308 may be designed to automatically transmit or receive voiceband signals, or to automatically receive Caller ID information, when hookswitch 106 is in the closed mode. When communications circuit 210 is designed to automatically transmit or receive voiceband signals, DSP 308 may implement one of many known speech compression and decompression algorithms in order to compress digitized voiceband signals or decompress stored compressed digitized voiceband signals. When communications device 200 is designed to receive Caller ID information, DSP 308 may implement one of many well known tone detection algorithms in order to decode the frequency-encoded Caller ID information.

Caller ID information and compressed digitized voiceband signals are stored in memory unit 310. Memory unit 310 preferably comprises one or more non-volatile semiconductor memory devices. Suitable non-volatile semiconductor memory devices include well known EEPROM devices, flash memory devices, and NV-RAM devices described above. Alternately, memory unit 310 may comprise volatile semiconductor memory devices, with the disadvantage that stored data will be lost if electrical power to memory unit 310 is interrupted. Suitable volatile semiconductor memory devices include well known RAM devices, including static and dynamic RAM devices.

Capacitor 206

Capacitor 206, labeled C in FIG. 2, performs several important functions when hookswitch 106 is in the open mode. These functions allow communications circuit 210 to receive and detect a ring signal. First, capacitor 206 forms a low impedance a.c. signal path between first switch terminal 114 and second switch terminal 116, effectively coupling a.c. signals from the telephone line to the input/output port of communications circuit 210. This allows communications circuit 210 to receive a.c. signals from the telephone line even when hookswitch 106 is in the open mode. Second, capacitor 206 blocks the d.c. operating voltage applied between the two wires of the telephone line by equipment in the central office as described above. This prevents a flow of d.c. current through communications circuit 210 when hookswitch 106 is in the open mode. Third, capacitor 206 attenuates the amplitudes of ring signals such that they fall within allowable input voltage ranges of common analog-to-digital converters.

The Federal Communications Commission (FCC) and the Electronics Industries Association (EIA) have established requirements for ring detection circuits (see EIA-470-A referenced above). These standards stipulate the maximum amount of electrical current which may flow through ring detection circuits subjected to fixed voltages at various frequencies, including d.c. By blocking d.c. current flow when hookswitch 106 is in the open mode, capacitor 206 allows communications device 200 to meet the FCC and EIA requirements.

Figure 4:
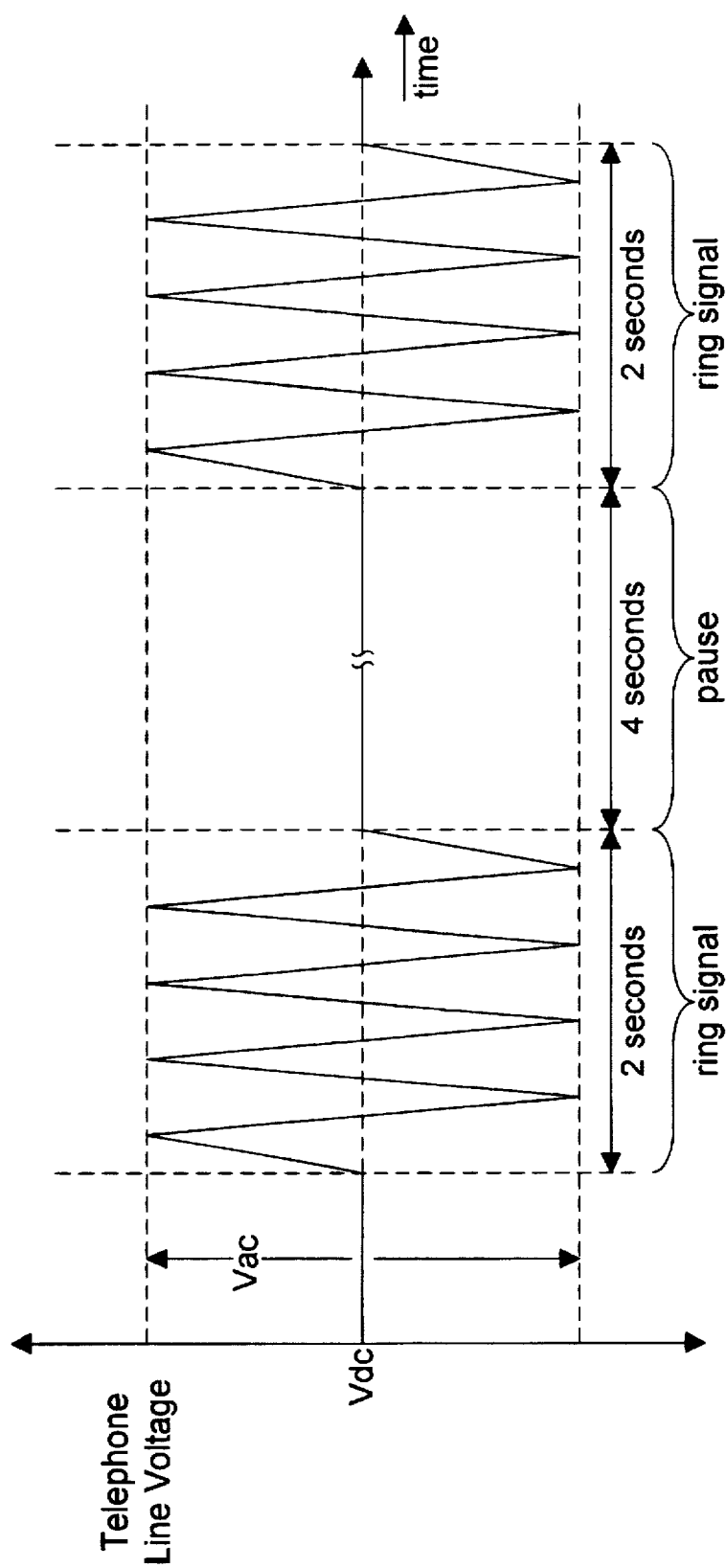
FIG. 4 is a graph of the voltage between two wires of a telephone line versus time during two consecutive ring signals.

FIG. 4 is a graph of the voltage between the two wires of the telephone line versus time during two consecutive ring signals. The ring signal pattern shown is used in the United States and most of Europe. Ring signals are issued for about two seconds, separated by a pause which lasts for approximately four seconds. Ring signals are superimposed upon the d.c. operating voltage (Vdc). The d.c. operating voltage Vdc is nominally 48 volts d.c. Ring signals are a.c. signals nominally 100 volts peak-to-peak (Vp-p) at a frequency of 20 hertz (Hz). Thus Vac in FIG. 3 is nominally 100 V.

A typical analog-to-digital converter has a maximum allowable input voltage range of about ±0.5 volts (i.e. 1.0 Vp-p). Thus the 100 Vp-p amplitudes of ring signals far exceed the maximum allowable input voltage ranges of common analog-to-digital converters. The amplitudes of ring signals must thus be greatly reduced (i.e., substantially attenuated) before being applied to the input port of analog-to-digital converter 304. In addition, substantial changes in the amplitudes of the Caller ID FSK signals at 1.200 Hz and 2.200 Hz may cause Caller ID signal detection problems. It is thus desirable to attenuate the amplitudes of 20 Hz ring signals to 1.0 Vp-p or below while affecting the amplitudes of a.c. signals at the Caller ID FSK frequencies of 1.200 Hz and 2.200 Hz as little as possible.

Interface unit 302 of communications circuit 210 typically includes a common hybrid circuit to couple signals to and from the telephone line via signal line 204. A hybrid circuit includes a pair of transformers having a common telephone line side winding. The telephone line side winding is connected across the wires of signal line 204 at the input/output port of communications circuit 210. The input impedance of the input/output port of communications circuit 210 is thus the impedance of the telephone line side winding, and is substantially equivalent to an inductance, represented by inductor 211 and labeled L in FIG. 2, in series with a resistance represented by resistor 212 and labeled R in FIG. 2. The series combination of capacitor 206, inductor 211, and resistor 212 forms a common R-L-C highpass filter. The value of capacitor 206 is operably chosen such that the amplitudes of 20 Hz ring signals are substantially attenuated while the amplitudes of a.c. signals at the Caller ID FSK frequencies of 1.200 Hz and 2.200 Hz are not substantially changed. Proper sizing of capacitor 206 may thus result in reductions of the amplitudes of 20 Hz ring signals to below the 1.0 Vp-p maximum allowable input voltage ranges of common analog-to-digital converters while allowing proper Caller ID circuit operation.

In FIG. 2, voltage $V_1$ is the a.c. signal voltage at connector 202 where communications device 200 connects to the telephone line. Voltage $V_2$ is the a.c. signal voltage at the input/output port of communications circuit 210. The process of operably selecting the value of capacitor 206 (C) may be carried out by describing the relationship between the magnitude of $V_1$, signified by $|V_1|$, and the magnitude of $V_2$, signified by $|V_2|$, as a function of the value of capacitor 206, selecting the value of capacitor 206 such that $|V_2|$ is less than or equal to 0.01 times $|V_1|$ at the ring signal frequency of 20 Hz, and checking to ensure that the selected value of C does not cause $|V_1|$ and $|V_2|$ to differ by more than 5 percent at the Caller ID FSK frequencies of 1.200 Hz and 2.200 Hz.

Amplitude variations at Caller ID FSK frequencies are limited to 5 percent or less in order to avoid Caller ID signal detection problems. The relationship between $|V_1|$ and $|V_2|$ is:

$$|V_2| = |V_1| \cdot \frac{\sqrt{R^2 + |Z_L|^2}}{\sqrt{R^2 + (|Z_L| - |Z_C|)^2}}$$

where:

R=value of resistor 212 (ohms), $|Z_L|$=magnitude of a.c. impedance of inductor 211 (ohms), $|Z_L|=2 \cdot f \cdot L$, $f$=a.c. signal frequency (Hz), L=value of inductor 211 (henrys), $|Z_C|$=magnitude of a.c. impedance of capacitor 206 (ohms), $$|Z_C| = \frac{1}{2 \cdot \pi \cdot f \cdot C}, \text{ and}$$

C=value of capacitor 206 (farads).

The values of inductor 211 and resistor 212 are assumed to be a typical values of 1.0 henry and 100 ohms, respectively. Solving $|V_2| \leq 0.01 \cdot |V_1|$ for C using the above equation at $f$=20 Hz yields C≤0.492 µF. A table of standard capacitor values is used to select a standard value for capacitor 206 which is less than or equal to 0.492 µF. Using the table, a standard value of 0.47 µF is selected for capacitor 206. It is noted that when a 20 Hz ring signal occurs, almost all of the 100 Vp-p amplitude of the ring signal appears across the terminals of capacitor 206. Thus capacitor 206 must be able to withstand a 100 Vp-p voltage applied across its terminals, and preferably more. Capacitor 206 is also preferably a non-polarized capacitor to allow capacitor 206 to function regardless of the polarity of d.c. operating voltage Vdc.

Substituting C=0.47 µF into the above equation at $f$=20 Hz yields $|V_2|$=0.00956·$V_1|$. Thus at the ring signal frequency of 20 Hz, the magnitude of voltage $V_2$ across the input/output port of communications circuit 210 is attenuated by approximately 99.04 (40.4 dBv). The 100 Vp-p amplitudes of incoming ring signals are reduced to 0.956 Vp-p, within the 1.0 Vp-p maximum allowable input voltage ranges of common analog-to-digital converters.

At the Caller ID FSK frequency of 1.200 Hz, $|V_2|$= 1.0389·$|V_1|$ when C=0.47 µF. Thus at 1.200 Hz the magnitude of voltage $V_2$ across the input/output port of communications circuit 210 is about 3.89 percent (0.33 dB$_v$) greater than the magnitude of voltage $V_1$ across the telephone line. This increase is less than 5 percent and should not result in Caller ID signal detection problems.

At the Caller ID FSK frequency of 2.200 Hz, $|V_2|$= 1.0113·$|V_1|$ when C=0.47 µF. Thus at 2.200 Hz the magnitude of voltage $V_2$ across the input/output port of communications circuit 210 is about 1.13 percent (0.10 dB$_v$) greater than the magnitude of voltage $V_1$ across the telephone line. As was true at the 1.200 Hz Caller ID FSK frequency, the increase is less than 5 percent and should not result in Caller ID signal detection problems.

Figure 5:
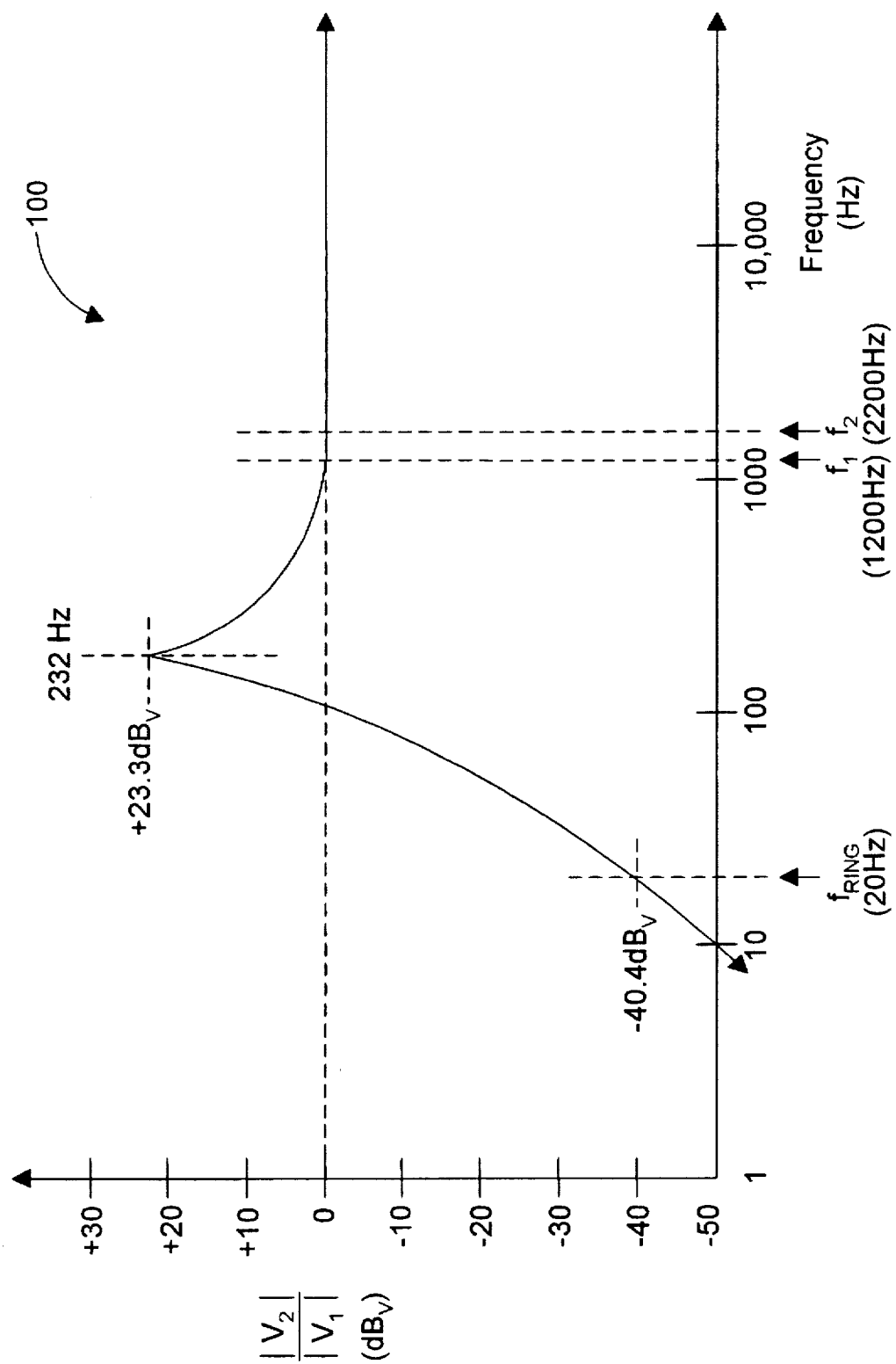
FIG. 5 is a graph of the ratio of the magnitude of the voltage across an input/output port of the communications circuit to the magnitude of the voltage across the telephone line as a result of an R-L-C highpass filter formed by the series combination of the capacitor and an inductor and resistor representing the input impedance of the communications circuit as shown in FIG. 2.

FIG. 5 illustrates the ratio of the magnitude of voltage $V_2$ across the input/output port of communications circuit 210 to the magnitude of voltage $V_1$ across the telephone line as a result of the R-L-C highpass filter formed by the series combination of capacitor 206, inductor 211, and resistor 212 as shown in FIG. 2. The ratio is along the vertical axis and is expressed in voltage decibel units (dB$_v$), where:

$$\frac{|V_2|}{|V_1|} (dB_v) = 20 \cdot \log_{10}\left(\frac{|V_2|}{|V_1|}\right)$$

The signal frequency (f) is along the horizontal axis, and the horizontal axis has a base 10 logarithmic (i.e., $\log_{10}$) scale. Inductor 211 has a value of 1.0 henry, resistor 212 has a value of 100 ohms, and the value of capacitor 206 was operably selected to be 0.47 µF as described above. The magnitude of voltage $V_2$ is attenuated by approximately 99.04 (40.4 $dB_v$) at the ring signal frequency of 20 Hz. Thus 100 Vp-p amplitudes of incoming ring signals are reduced to 0.956 Vp-p, within the 1.0 Vp-p maximum allowable input voltage ranges of common analog-to-digital converters. At about 232 Hz, the magnitudes of the impedances of capacitor 206 and inductor 211 are equal, and the ratio of $|V_2|$ to $|V_1|$ is a maximum (i.e., approximately 14.6, or +23.3 $dB_v$). A "hump" exists in the frequency response curve centered around 232 Hz as shown in FIG. 5. It is noted that the hump in the frequency response curve exists only when hookswitch 106 is in the open mode. When hookswitch 106 is in the open mode, communications circuit 210 is monitoring only ring signals at 20 Hz and the Caller ID FSK signals at 1,200 and 2,200 Hz. At the lowest Caller ID FSK frequency of 1,200 Hz, $|V_2|$ is only about 3.89 percent (0.33 $dB_v$) greater than $|V_1|$. At the 2,200 Hz Caller ID FSK frequency, $|V_2|$ is only about 1.13 percent (0.10 $dB_v$) greater than $|V_1|$. These slight amplitude increases at the Caller ID FSK frequencies should not result in Caller ID signal detection problems.

Thus the hump in the frequency response curve does not affect the operation of communications device 200.

Control Unit

When hookswitch 106 is in the open mode and DSP 308 detects a ring signal, DSP 308 asserts a ring detect signal. Control unit 108 is coupled to receive the ring detect signal. Control unit 108 includes a counter circuit which is incremented each time the ring detect signal is asserted. Control unit 108 asserts the hookswitch control signals after the ring detect signal has been asserted a predetermined number of times (i.e., after a predetermined number of ring signals have been detected). Assertion of the hookswitch control signal causes hookswitch 106 to transition from the open mode to the closed mode. At the same time, control unit 108 asserts an appropriate control signal which causes communications circuit 210 to transmit or receive voiceband signals.

Conclusion

A communications device is presented which is able to detect a ring signal without the need for dedicated ring signal detection circuitry. The communications device includes a hookswitch coupled between a telephone line and a communications circuit. The communications circuit includes an analog-to-digital converter and a DSP. The analog-to-digital converter provides a stream of digitized input signal information to the DSP. In an open mode of the hookswitch, an electrical resistance of greater than 25 megohms exists between two switch terminals of the hookswitch, and the communications circuit is essentially disconnected from the telephone line at d.c. (i.e., 0 Hz). A capacitor positioned between the switch terminals of the hookswitch couples a.c. signals from the telephone line to the communications circuit when the hookswitch is in the open mode. The DSP performs ring signal detection when the hookswitch is in the open mode using electrical power provided by a power supply. The input impedance of the communications circuit is substantially equivalent to a 1.0 henry inductor in series with a 100 ohm resistor. The series combination of the capacitor and the inductor and resistor of the communications circuit forms an R-L-C highpass filter. The value of the capacitor is operably chosen such that: (i) the amplitudes of 20 Hz ring signals are reduced to below a 1.0 Vp-p maximum allowable input voltage range of common analog-to-digital converters, and (ii) the amplitudes of a.c. signals at Caller ID frequency shift keying frequencies of 1,200 Hz and 2,200 Hz are not increased or attenuated to a degree which would impair Caller ID circuit operation.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A communications device adapted for coupling to a telephone line carrying an a.c. ring signal, wherein the telephone line comprises a first and second wire, the communications device comprising:

a hookswitch having a first and second switch terminal and a control terminal, wherein the first switch terminal is coupled to the first wire of the telephone line, and wherein the control terminal is coupled to receive a control signal, and wherein an open condition exists between the first and second switch terminals when the control signal is not asserted, and wherein a closed condition exists between the first and second switch terminals when the control signal is asserted;

a communications circuit having a first and second terminal, wherein the first terminal of the communications circuit is coupled to the second switch terminal of the hookswitch and the second terminal of the communications circuit is coupled to the second wire of the telephone line, and wherein the communications circuit is configured to detect the a.c. ring signal and to generate a ring detect signal, and wherein the communications circuit asserts the ring detect signal when the a.c. ring signal is detected; and a capacitor having a first terminal and a second terminal, wherein the first terminal of the capacitor is connected to the first switch terminal of the hookswitch, and wherein the second terminal of the capacitor is connected to the second switch terminal of the hookswitch, and wherein the capacitor couples the a.c. ring signal from the first switch terminal to the second switch terminal when the hookswitch control signal is not asserted.

2. The communications device as recited in claim 1, wherein the electrical resistance between the first and second switch terminals of the hookswitch is greater than 25 megohms in the open condition.

3. The communications device as recited in claim 1, wherein the electrical resistance between the first and second switch terminals of the hookswitch is less than 1 ohm in the closed condition.

4. The communications device as recited in claim 1, wherein the a.c. ring signal has a frequency of about 20 Hz and an amplitude approximately 100 volts peak-to-peak.

5. The communications device as recited in claim 4, wherein the telephone line also carries a plurality of a.c. voiceband signals, wherein the frequencies of the a.c. voiceband signals are between 300 Hz and 3,000 Hz.

6. The communications device as recited in claim 5, wherein the plurality of a.c. signals includes a first Caller ID transmission signal at a frequency of about 1,200 Hz and a second Caller ID transmission signal at a frequency of approximately 2,200 Hz.

7. The communications device as recited in claim 6, wherein the impedance between the first and second terminals of the communications circuit is substantially equivalent to a series combination of an inductance and a resistance.

8. The communications device as recited in claim 7, wherein the series combination of the capacitor and the equivalent inductance and resistance between the first and second terminals of the communications circuit effectively forms an R-L-C highpass filter.

9. The communications device as recited in claim 8, wherein the size of the capacitor is operably chosen such that the amplitude of the 20 Hz ring signal is attenuated by at least 99 percent while the amplitudes of the first and second Caller ID transmission signals are not increased or attenuated by more than 5 percent.

10. The communications device as recited in claim 1, wherein the communications circuit includes an analog-to-digital converter and a digital signal processor, wherein the digital signal processor performs a ring signal detection function when the hookswitch control signal is not asserted.

11. A communications device adapted for coupling to a telephone line carrying an a.c. ring signal, wherein the telephone line comprises a first and second wire, the communications device comprising:

a connector having a first and second terminals adapted for coupling to the first and second wires of the telephone line, respectively;

a communications circuit having a first and second terminal, wherein the second terminal of the communications circuit is connected to the second terminal of the connector, and wherein the communications circuit is configured to detect the a.c. ring signal and to generate a ring detect signal, and wherein the communications circuit asserts the ring detect signal when the a.c. ring signal is detected;

a control unit coupled to receive the ring detect signal and configured to generate a hookswitch control signal, wherein the control unit asserts the hookswitch control signal following a predetermined number of assertions of the ring detect signal;

a hookswitch having a first and second switch terminals and a control terminal, wherein the first switch terminal is coupled to the first terminal of the connector, and wherein the second switch terminal is connected to the first terminal of the communications circuit, and wherein the control terminal is coupled to receive the hookswitch control signal, and wherein an open condition exists between the first and second switch terminals when the control signal is not asserted, and wherein a closed condition exists between the first and second switch terminals when the control signal is asserted;

a capacitor having a first and second terminals, wherein the first terminal of the capacitor is connected to the first switch terminal of the hookswitch, and wherein the second terminal of the capacitor is connected to the second switch terminal of the hookswitch, and wherein the capacitor couples the a.c. ring signal from the first switch terminal to the second switch terminal when the hookswitch control signal is not asserted; and a power supply configured to provide electrical power to the communications circuit and to the control unit.

12. The communications device as recited in claim 11, wherein the electrical resistance between the first and second switch terminals of the hookswitch is greater than 25 megohms in the open condition.

13. The communications device as recited in claim 11, wherein the electrical resistance between the first and second switch terminals of the hookswitch is less than 1 ohm in the closed condition.

14. The communications device as recited in claim 11, wherein the a.c. ring signal has a frequency of about 20 Hz and an amplitude of approximately 100 volts peak-to-peak.

15. The communications device as recited in claim 11, wherein the telephone line also carries a plurality of a.c. voiceband signals, wherein the frequencies of the a.c. voiceband signals are between 300 Hz and 3,000 Hz.

16. The communications device as recited in claim 15, wherein the plurality of a.c. signals includes a first Caller ID transmission signal at a frequency of about 1,200 Hz and a second Caller ID transmission signal at a frequency of approximately 2,200 Hz.

17. The communications device as recited in claim 16, wherein the impedance between the first and second terminals of the communications circuit is substantially equivalent to a series combination of an inductance and a resistance.

18. The communications device as recited in claim 17, wherein the series combination of the capacitor and the equivalent inductance and resistance between the first and second terminals of the communications circuit effectively forms an R-L-C highpass filter.

19. The communications device as recited in claim 18, wherein the size of the capacitor is operably chosen such that the amplitude of the 20 Hz ring signal is attenuated by at least 99 percent while the amplitudes of the first and second Caller ID transmission signals are increased or attenuated by no more than 5 percent.

20. The communications device as recited in claim 11, wherein the communications circuit includes an analog-to-digital converter and a digital signal processor, wherein the digital signal processor performs a ring signal detection function when the hookswitch control signal is not asserted.

* * * * *